J. BURGESS.
Soldering-Iron Heater.
No. 213,493. Patented Mar. 25, 1879.
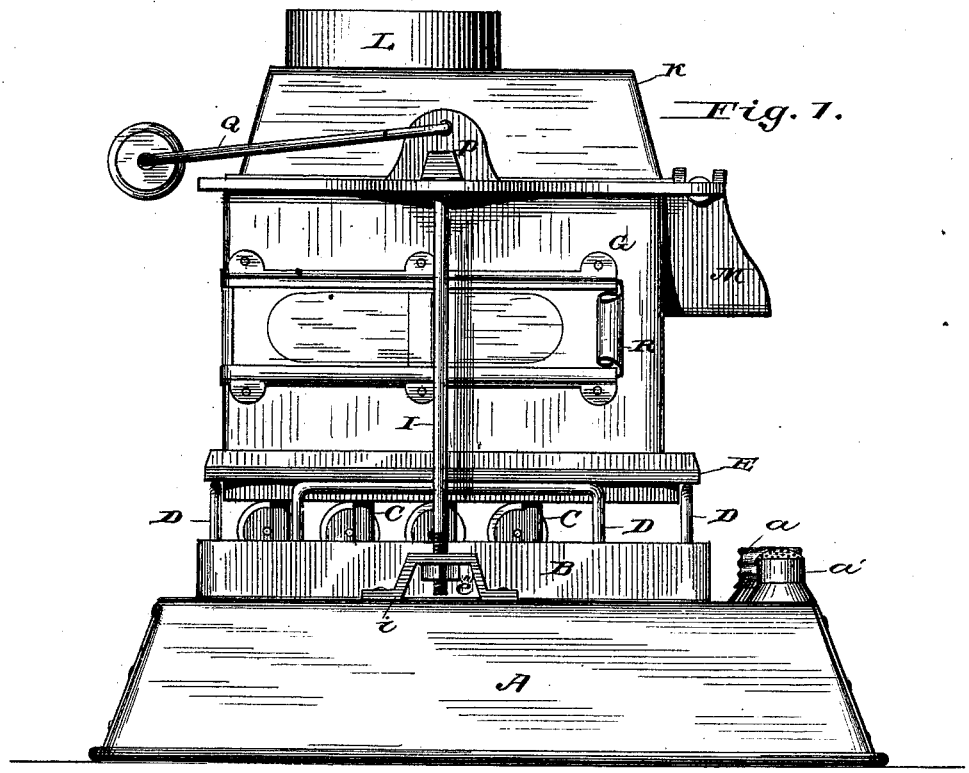
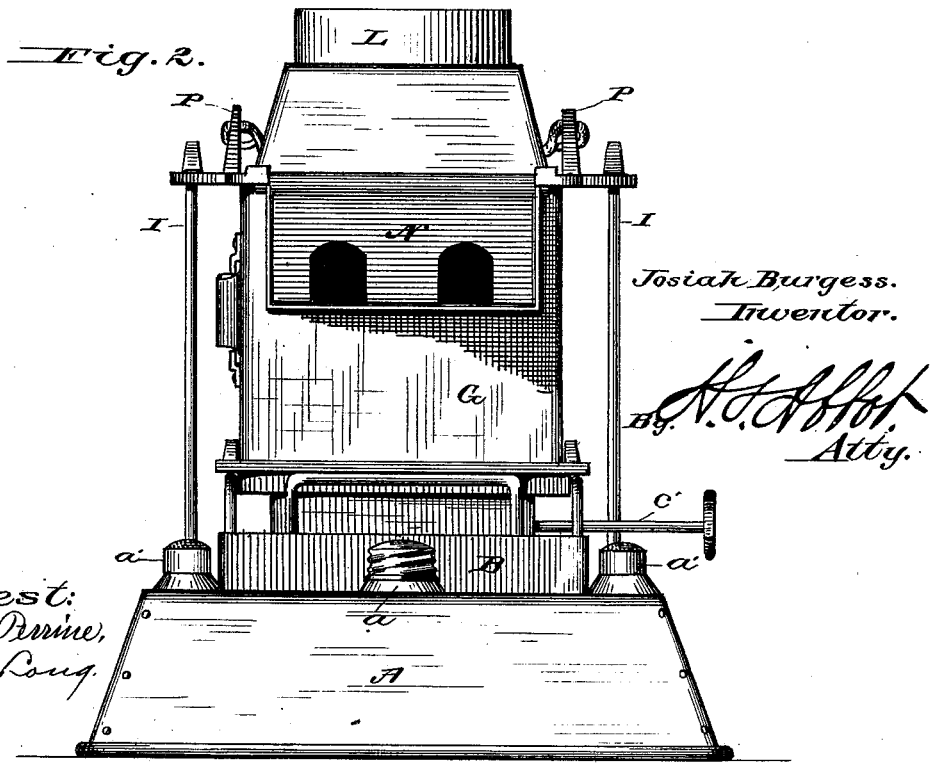

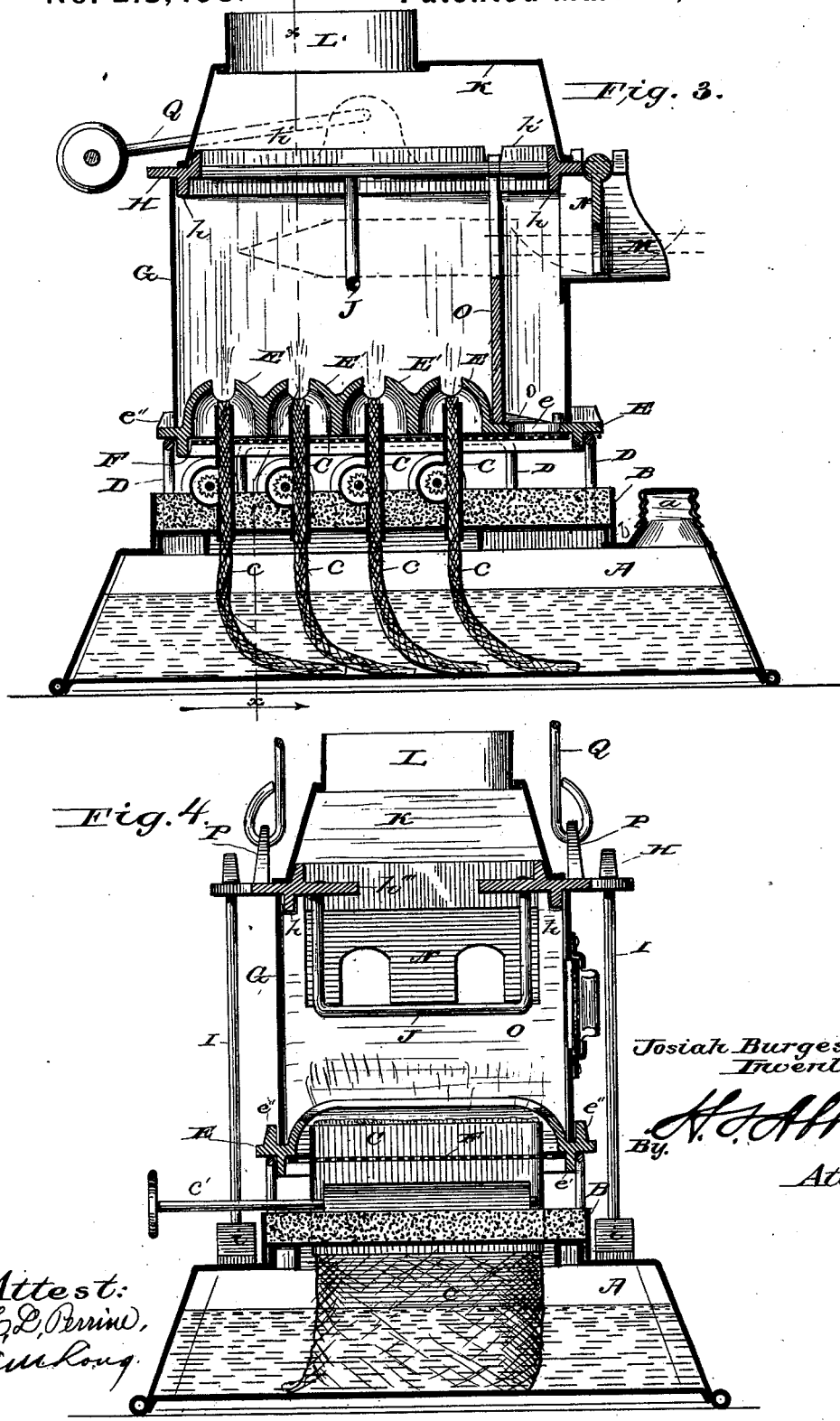

J. BURGESS.
Soldering-Iron Heater.

No. 213,493. Patented Mar. 25, 1879.

Attest:
H. L. Perrine
A. M. Long.

Josiah Burgess.
Inventor.
By H. J. Abbot
Atty.

UNITED STATES PATENT OFFICE.

JOSIAH BURGESS, OF ZANESVILLE, OHIO.

IMPROVEMENT IN SOLDERING-IRON HEATERS.

Specification forming part of Letters Patent No. 213,493, dated March 25, 1879; application filed January 25, 1879.

*To all whom it may concern:*

Be it known that I, JOSIAH BURGESS, of Zanesville, in the county of Muskingum and State of Ohio, have invented certain new and useful Improvements in Soldering-Furnace or Soldering-Iron Heaters; and I do hereby declare that the following is a full, clear, and exact description of the invention, which will enable others skilled in the art to which it appertains to make and use the same, reference being had to the accompanying drawings, and to letters of reference marked thereon, which form a part of this specification, and in which—

Figure 5:
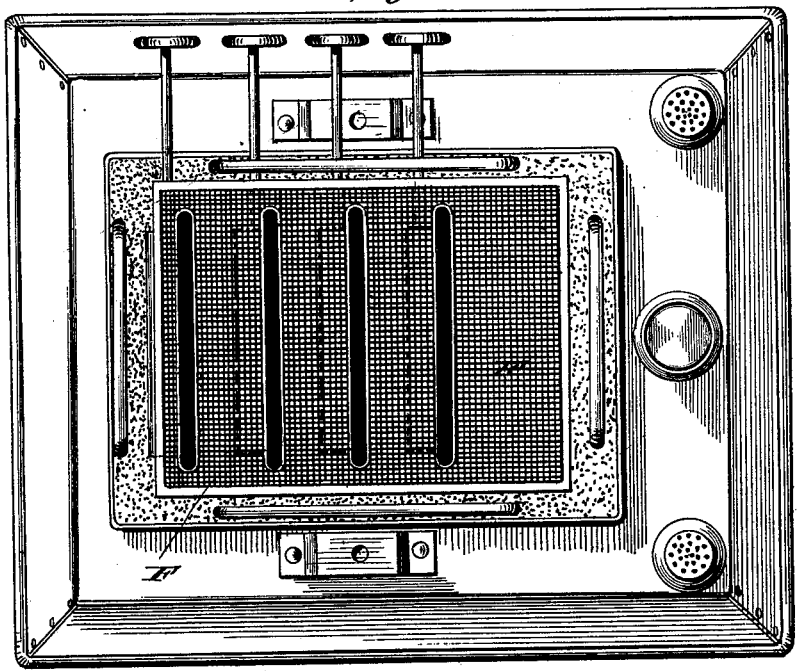
Figure 6:
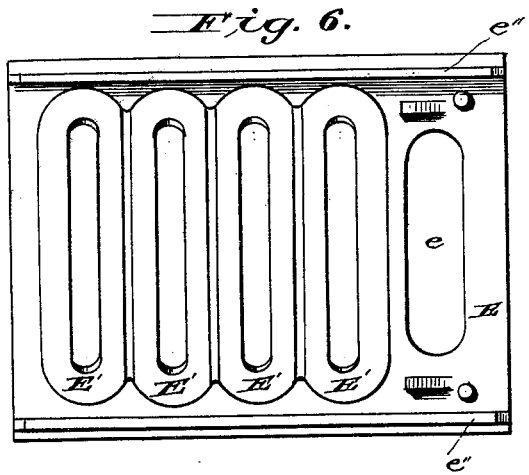

Figure 1 is a side view of the furnace; Fig. 2, a front end view; Fig. 3, a vertical section from front to rear of furnace; Fig. 4, a cross-section looking from rear of furnace; Fig. 5, a top view of oil-reservoir, wick-tubes, and perforated plate with burner plate and cylinder removed, and Fig. 6 a detached top view of burner-plate.

My invention relates to furnaces for heating soldering-irons, and is an improvement on the patent granted to me June 18, 1878, No. 205,049.

It consists in the construction and arrangement and combination of the several parts, as hereinafter particularly specified.

In the accompanying drawings, A indicates the oil-reservoir, provided with a capped opening, $a$, through which the oil is poured, and with perforated caps or tubes $a'$, serving as vents for the escape of gas from the reservoir. This reservoir has an opening in its top for the passage of the wicks therein and a flange around the opening.

On top of the reservoir and over the opening therein there is placed a cover or pan, B, having a flange, $b$, around its bottom, which flange fits around that on the oil-reservoir and holds the pan in position. This pan is filled with asbestus, plaster-of-paris, or other equivalent non-conducting material, for the purpose of protecting the oil from the heat radiated from the burners above. Tubes C pass through and rise upward from this pan, and the wicks $c$ are worked therein by means of the toothed thumb-rods $c'$.

Rods D, or their equivalents, are secured to the pan, and are to serve as supports for the burner-plate E. This burner-plate consists of a series or group of burners, E', arranged closely together, and having converging sides, as shown, and has at one or both ends an opening, $e$, and is provided with downwardly and upwardly projecting flanges $e'$ $e''$, respectively.

The downwardly-projecting flange fits inside and against the rods D, by which means the plate is held securely in place. Beneath this plate and resting on beads or lugs formed on the sides of the wick-tubes is placed a perforated or wire-gauze plate, F, which serves to admit air to the burners and to the air-chamber, hereinafter described.

A cylinder, G, preferably of square or rectangular shape, rests on the burner-plate, and the upwardly-projecting flange on the latter, together with the ends of the burners, tend to hold it in place. On the top of this cylinder is placed a plate, H, having a downwardly-projecting flange, $h$, which fits within the cylinder and bears against or is adjacent to the sides of the cylinder, and braces or strengthens the sides thereof. It has an upwardly-projecting flange, $h'$, and also an opening, $h'''$, in the top, extending from front to rear, at right angles to the length of the burners, and in width narrower than the length of the burner. This plate is strapped down by means of rods I, passed through that portion of the plate which projects beyond the sides of the cylinder, or through ears P thereon, and through brackets $i$, bolted to the oil-reservoir, and is held by means of nuts $e'''$, screwed onto the ends of the rods. These rods hold the several parts together and strengthen them.

From the top of the plate H, within the cylinder, over the burners, is suspended a frame, J, on which the soldering-iron is to rest while being heated. On the plate H is placed a hood or cover, K, provided with chimney or flue L. This chimney may be so located in the cover that when the latter is on the cylinder the chimney will come over, or very nearly over, the middle burners of the furnace.

A portion of the front of the cylinder, near its top, is cut away, in order that a resting-plate, M, may be secured thereto by bolts, flanges, or other suitable means. In this resting-plate there is hung a door, N, the door having journals which rest on the side of the cylinder or in depressions formed in the projecting portion of the plate H for that purpose, and has openings in the same for the passage therethrough of the soldering-irons. This door may be dispensed with, if desired, as the partition now to be described renders its use not absolutely necessary.

An air-chamber is formed in one or both ends of the cylinder by interposing a partition, O, between the burners and the ends of the cylinder. This partition rests on the burner-plate, and is kept from slipping at its bottom by means of lugs o, and has an opening in the upper portion for the passage of air into the heating-chamber proper. The sides of this plate, which extend above the opening in it, are passed through slots cut in the plate or cap H, as seen in Fig. 2, so as to hold the partition in place from the top.

Air passes into the air-chamber from below through the perforated plate and the opening in the burner-plate hereinbefore described, and from thence over into the heating-chamber. The supply of air in this way greatly increases the heat within the chamber without disturbing the flame.

Ears P are cast with or otherwise made a part of plate H, and to the ears there is fastened a bail or handle, Q, by means of which the furnace can be moved or carried from one place to another.

The cylinder G is provided with a sliding door, R, placed opposite to the burners, so that it may be drawn to one side and the burners lighted without disturbing other parts of the furnace. This door is provided with a transparent or translucent face of isinglass or other suitable material, in order that the operator may view the interior of the furnace without opening the door. This door also gives sufficient light in the dark from the burner-flame to enable the operator to work at night or in dark places without other light.

In operation, the sliding door is thrown open and the wicks lighted. The soldering-iron is inserted through the swinging door in front, through an opening in the partition, and rested on the frame suspended within the cylinder. The heat strikes the iron from below, passes up around the sides thereof and against the top plate, by which it is deflected over the tops of the irons, and thence out through the contracted and longitudinal opening in the top into the dome or cover above, from whence it passes out through the chimney. The heat is thus caused to heat the sides and top of the iron, as well as the bottom.

The air admitted into the air-chamber at the end of the cylinder passes therefrom over into the heating-chamber at a point sufficiently above the burners not to disturb the flame, and it greatly increases the heat within the cylinder. By reason of the burners being arranged across the cylinder at right angles to the contracted opening in the plate above, the heat is caused to be disseminated throughout the cylinder and to be deflected from the sides toward the center at the top, thus heating the iron on all sides. By grouping the burners, as shown and described, the heat is concentrated and the irons more quickly heated.

The location of the resting-plate and swinging door on the sides of the cylinder allows the soldering-iron to be introduced into the cylinder without disturbing the flame.

The cap or plate H at the top of the cylinder may be made of cast-iron or copper. When of the latter material, the copper is quickly heated, and contributes to the heating of the irons.

By resting the burner-plate on rods or flanges rising from the oil-reservoir, a free circulation of air is allowed under the burner-plate, thereby supplying the burners with abundance of air for combustion purposes.

Having described my invention, what I claim is—

1. The burner-plate E, provided with a series of burners, E', and with opening e, substantially as and for the purpose set forth.

2. The burner-plate E, provided with a series of burners, with opening e and flanges e' e'', substantially as and for the purpose set forth.

3. The burner-plate E, provided with a series of burners, with opening e and flanges e' e'', in combination with cylinder G, oil-reservoir A, tubes C, and perforated plate F, substantially as set forth.

4. The cap or plate H, provided with flanges h h' and opening h''', substantially as and for the purpose set forth.

5. The cap or plate H, provided with a frame, J, suspended therefrom within the heating-cylinder, substantially as and for the purpose set forth.

6. The cylinder G, provided within its interior with a group of burners, and at or near its top with a cap or plate, H, having an opening therein in length at right angles to and in width narrower than the length of burner, substantially as and for the purpose set forth.

7. The combination of the cylinder G, group of burners E', cap or plate H, having opening therein, as described, and pendent frame J, substantially as and for the purpose set forth.

8. The combination of cylinder G, a group of burners within the same, a cap or plate, as described, at its top, with an opening therein, as described, and an air-chamber at the end, all substantially as and for the purpose described.

9. The combination of the cylinder G, burners E', plate H, with an opening, as described, pendent frame J, partition O, resting-plate M, and swinging door N, substantially as set forth.

10. The cylinder G, provided with cap H, having an opening, as described, in combination with hood K and flue L, substantially as set forth.

11. The combination of cylinder G and plates

E and H, both constructed as described, and oil-reservoir A and rods I, substantially as set forth.

12. The cylinder G, provided with plates H and E, constructed substantially as described, pendent frame J, and partition O, in combination with hood K, provided with flue L and oil-reservoir A, a non-conducting cover thereto, tubes C, and supports D, substantially as and for the purpose set forth.

In testimony that I claim the foregoing as my own I affix my signature in presence of two witnesses.

JOSIAH BURGESS.

Witnesses:
 THEODORE MOORE,
 B. F. SPALDING.